United States Patent [19]
Van Dyke

[11] Patent Number: 4,944,005
[45] Date of Patent: Jul. 24, 1990

[54] ADJUSTABLE STRAP FOR TELEPHONE HANDSET SUPPORT

[76] Inventor: Lyle H. Van Dyke, P.O. Box 14841, Portland, Oreg. 97214

[21] Appl. No.: 395,181

[22] Filed: Aug. 17, 1989

Related U.S. Application Data

[63] Continuation of Ser. No. 154,443, Feb. 5, 1988, abandoned, which is a continuation of Ser. No. 765,695, Aug. 15, 1985, abandoned.

[51] Int. Cl.⁵ .................. H04M 1/04; B65D 63/00
[52] U.S. Cl. .................. 379/449; 24/17 AP; 24/30.5 P; 24/30.5 R; 248/74.3; 379/430; 379/454
[58] Field of Search .............. 379/449, 447, 454, 441, 379/430; 248/74.3; 24/17 B, 17 AP, 30.5 P, 30.5 R

[56] References Cited

U.S. PATENT DOCUMENTS

| | | | |
|---|---|---|---|
| 1,886,227 | 11/1932 | Reisner | 24/17 AP |
| 2,640,111 | 5/1953 | Samsky et al. | 379/449 |
| 2,644,043 | 6/1953 | Zakos | 379/449 |
| 2,936,980 | 5/1960 | Rapata | 24/17 AP |
| 3,025,360 | 3/1962 | Van Dyke | 379/449 |
| 3,176,087 | 3/1965 | Schetzer | 379/430 |
| 3,176,987 | 4/1965 | Johnston | 273/77 R |
| 3,277,601 | 10/1966 | Ryan | 446/378 |
| 3,830,987 | 8/1974 | Van Dyke | 379/449 |
| 4,150,463 | 4/1979 | Brown | 24/30.5 P |
| 4,241,242 | 12/1980 | Yeh et al. | 379/449 |
| 4,383,140 | 5/1983 | Goodman | 379/446 |
| 4,406,040 | 9/1983 | Cannone | 241/35 |
| 4,477,950 | 10/1984 | Cisek et al. | 24/30.5 P |
| 4,736,417 | 4/1988 | Van Dyke | 379/449 |

FOREIGN PATENT DOCUMENTS

| | | | |
|---|---|---|---|
| 266255 | 3/1964 | Australia. | |
| 768457 | 5/1934 | France | 24/17 A |
| 1287493 | 2/1962 | France | 24/30.5 P |

*Primary Examiner*—Jin F. Ng
*Assistant Examiner*—Danita R. Byrd
*Attorney, Agent, or Firm*—Johnson & Gibbs

[57] ABSTRACT

Apparatus for securing telephone handsets of varying sizes to a telephone handset support (intermediary attachment) to in which a two piece strap is secured on each end to the telephone handset support, and the two sections are attached together by means of a slots in one strap piece and an engaging tab on the other piece. The slots in the first strap piece are spaced along the length thereof, and are elongated and are either triangular or rectangular in shape. The engaging tab in the second strap piece is formed by notches on each side of and near the end of the second strap piece. The width of the engaging tab is smaller than the longer dimension of any of the elongated slots in the first strap section. The neck of the engaging tab is slightly smaller than the width of the elongated slots in the first strap section. In this manner the engaging tab will pass into any of the slots when turned sidewise along the longer dimension of the slot, but will not pass back through the slot when the first and second strap sections are aligned lengthwise. The multiple slots permit the strap to be lengthened or shortened to accommodate telephone handset of varying sizes and shapes.

1 Claim, 1 Drawing Sheet

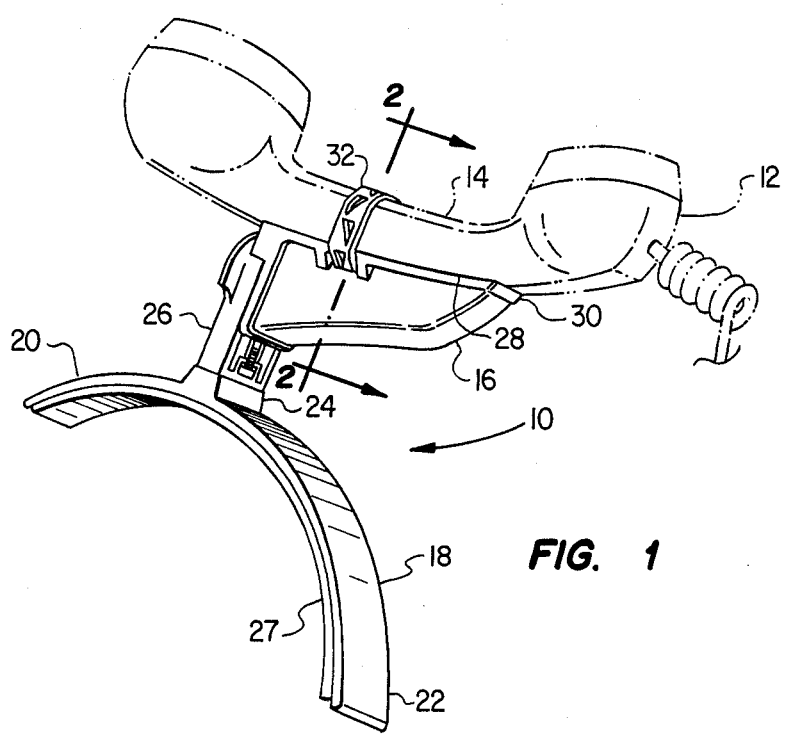
FIG. 1
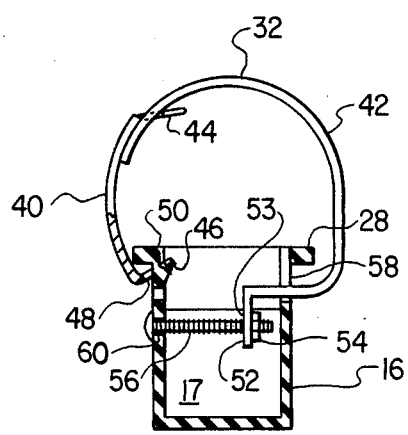
FIG. 2
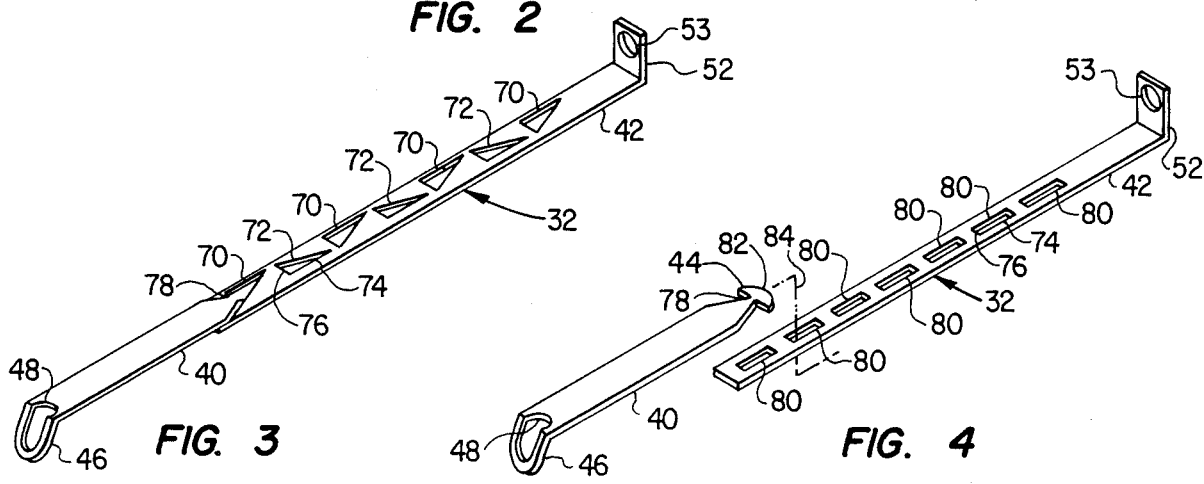
FIG. 3
FIG. 4

ADJUSTABLE STRAP FOR TELEPHONE HANDSET SUPPORT

This is a continuation of Ser. No. 154,443, filed 2/5/88, which is a continuation of Ser. No. 765,695, filed 8/15/85, both now abandoned.

BACKGROUND OF THE INVENTION

The invention relates to telephone accessories, and more particularly to new and useful improvements in telephone handset supports, and most particularly to adjustable straps for attaching handsets of various sizes and shapes to such supports.

There are many situations in which it is desirable to use a telephone while keeping the hands free to perform other tasks. This need has been met by the telephone handset support, which in general supports a telephone handset adjacent the ear and mouth by means of a curved base member placed on the shoulder. Examples of such supports are disclosed in several prior patents including the Applicant's own U.S. Pat. Nos. 3,025,360 and 3,830,987.

Previous handset support designs used a metal strap to attach the handset to the support. However, these previous designs used a fixed length strap which was suitable for only a single telephone handset size and shape. The strap attached to the handset support on each end and passed around the handset between the mouthpiece and earpiece to secure the handset to the support. On one end, the strap would typically be attached by an eyelet to a post and the other end by means of a screw.

The fixed length of the previous straps inherently limited the handset support to use with a limited number of handsets, which presented no severe problem since there were only a limited number of telephone set manufacturers and designs. With the proliferation of telephone set manufacturers and the new emphasis upon marketing, however, the number of different shapes and sizes of telephone handsets has increased dramatically.

It is therefore an object of the present invention to provide a new and useful means for attaching a telephone handset to a handset support, which will accommodate a large variety of handset sizes and shapes.

It is a further object of the present invention to provide a new and useful means for attaching a telephone handset to a handset support which is adjustable.

It is another object of the present invention to provide a new and useful means for attaching a telephone handset to a handset support which is fast and easy to use.

It is a still another object of the present invention to provide a new and useful means for attaching a telephone handset support which is adjustable.

It is yet another object of the present invention to provide a new and useful means for attaching a telephone handset support which is secure.

SUMMARY OF THE INVENTION

These and other objects of the invention are accomplished by providing a first strap member attachable to the handset support and adapted to pass around a portion of the handset. The first strap also has a plurality of elongated slots along the length thereof, the slots being oriented with their longer dimensions lengthwise of the first strap member. Also provided is a second strap member attachable to the handset support and adapted to pass around a portion of said handset. The second strap member also has notches formed on each side near the end thereof to provide an integral tab having a narrowed neck for engaging the slots in said first strap member. When the first and second strap members are secured together, they surround the handset portion to secure it to the handset support. The plurality of slots in the first strap member permit adjustment to accommodate a variety of telephone handset sizes and shapes.

BRIEF DESCRIPTION OF THE DRAWINGS

The manner of making and using the invention is is illustrated in the attached drawings, wherein:

FIG. 1 is an isometric view of a telephone handset support with a telephone handset (shown in phantom) attached to the support by means of the strap embodying the present invention;

FIG. 2 is a cross-section of the telephone handset support and strap taken along section line 2—2;

FIG. 3 is an orthogonal view of one embodiment of the strap of the present invention; and FIG. 4 is an orthogonal view of an alternative embodiment of the strap of the present invention.

DETAILED DESCRIPTION OF THE INVENTION

Referring first to FIG. 1, support 10 is attached to a conventional telephone handset 12 having the usual handle 14. Support 10 includes an attachment member 16 for accommodating handle 14 of handset 12, and a shoulder rest 18 which is in the form of an arced or curved cradle member having legs 20 and 22, which are intended to overlie the front and back portions of the shoulder of a user. Shoulder rest 18 has a square boss or node 24 on the convex side thereof for perpendicularly mating shoulder rest 18 to support member 26. Support member 26 is itself perpendicularly attached to attachment member 16. Preferably, the attachment member 16, shoulder rest 18, and support member 26 are formed of plastic or other material capable of being molded. A coextensive pad 27 of soft rubber or other suitable cushioning material overlies and is secured to the inner, curved surface of shoulder rest 18.

Attachment member 16 has a concave, arcuate upper surface 28 to mate with curved handle 14 of handset 12. Upper surface 28 is preferably coextensively covered by a pad 30 of soft rubber or other suitable cushioning material. When installed, handset 12 lies on pad 30 and is secured to support member 26 by means of a strap 32.

The manner of attachment of strap 32 to attachment member 16 is shown in greater detail in FIG. 2. Attachment member is generally rectangular in cross section and is provided with a rectangular void 17 for receiving the attachment mechanism. Attachment member 16 is provided with a slot 58 on one side thereof near upper surface 28 to permit passage of strap 32 into void 17. Attachment member 16 is also provided with an integral recessed post 50 on the other side thereof near upper surface 28. A hole 60 for receiving a screw is also provided directly below post 50.

Strap 32 includes two sections 40 and 42 which are interconnected by means of a tab 44. Strap section 40 has an angled end section 46 having an eyelet 48 therein which is passed over post 50. Strap section 42 has an angled end section 52 having hole 53 for receiving a screw 56. Angled end is bent to permit it to pass into void 17 through slot 58 in the side of attachment member 16. Screw 56 passes through hole 60 in the side of attachment member 16 opposite slot 58 into void 17, through hole 53 in strap section 42, and engages a nut 54 which secures angled end 52 to member 16 inside void 17.

Strap 32 is shown in greater detail in FIG. 3. Strap 32 includes two sections 40 and 42 which are both preferably made from flexible metal ribbon. Strap section 42 has an angled end section 52 having a hole 53 therein as previously described. Strap section 42 also has a multiplicity of triangular shaped slots 70 and 72 cut therein, preferably equidistantly, along the length thereof. Slots 70 and 72 are shaped as right triangles having a side 74 parallel to the side of strap section 42 and a side 76 perpendicular to the side of strap section 42. In general, in this and the embodiment to be described in connection with FIG. 4, the longer dimension of slots 70 and 72 (slots 80 in FIG. 4) are oriented lengthwise along strap section 42. Only one slot is referred to by reference numerals, but it should be understood that all slots 70 and 72 are identical in shape.

Side 74 of slot 72, and the like, is substantially longer than side 76 and is sized slightly larger than tab 44 in order to receive the width of tab 44 (see FIG. 4). Side 74 is sized slightly larger than the width of neck 78 of tab 44 in order to receive neck 78 therein. Thus, Tab 44 can be turned sideways to pass through slot 70 or 72 and then turned 90 degrees such that tab 44 is secured in slot 70 or 72. Slots 70 and 72 are identical in shape, but they are oppositely oriented such that their long sides 74 (as well as their hypotenuses) are on opposite sides of strap section 42, and they are alternated along the length of the strap section, such that every other slot is identically oriented along strap section 42. This permits tab 44 to turn in slot 70 or 72 to a larger extent without the tab's coming out of the slot.

Strap section 40 is identical to that shown in the embodiment of FIG. 4 and will be described in connection with FIG. 4.

An alternative embodiment of strap 32 is shown in FIG. 4. Strap section 42 is identical to strap section 42 shown in FIG. 3, except for the shape of the slots. Strap section 42 has a multiplicity of rectangular slots 80 whose longest dimensions are oriented along the length of strap section 42. The lengths of slots 80 are sized to receive the width of tab 44 on strap section 44, and the widths are sized to accommodate the neck 78 of tab 44 in the same manner as slots 70 and 72 in FIG. 3.

Strap section 44 has an angled end 46 which has an eyelet 48 therein as previously described. The other end of strap section 44 has an integral tab 44 with a rounded head 82 formed by cutting triangular slots in the side of section 40 near the end thereof to form a neck 78. Tab 44 is adapted to pass through any one of slots 80 (or slots 70 or 72, as the case may be) when the tab is turned sidewise and to lock strap sections 40 and 42 together when the two are turned back into longitudinal alignment.

The multiple slots 70 and 72 in the embodiment of FIG. 3, and the slots 80 of FIG. 4 permit tab 44 to be placed in any desired slot such that the strap can be lenthened or shortened to accommodate telephone handsets of varying sizes and shapes.

In operation, angled end section 52 of strap section 42 is passed through slot 58 in member 16. Screw 56 is passed through hole 60 and through hole 53 in angled end 52, and the end 52 is secured to screw 56 by a nut 54.

Tab 44 of strap section 40 is passed sidewise, as previously described, through a slot 70 or 72 (slot 80 in the case of the embodiment of FIG. 4) in strap section 42, and sections 40 and 42 are secured together by turning them into longitudinal alignment. The particular slot 70 or 72 chosen for insertion of tab 44 depends upon the size of handle 14 of handset 12.

Handset 12 is placed on surface 28 of member 16, and strap 32 is wrapped around handle 14 as shown in FIG. 1. Eyelet 48 in angled end section 46 is then passed over post 50. Screw 56 is then tightened, which draws more of strap section 42 through slot 58, thereby tightening strap 32 about handle 14. When the desired degree of tightness is attained, the handset 12 and handset support 10 are ready for use.

While particular embodiments of the present invention have been shown an described, it is obvious that minor changes and modifications may be made therein without departing from the true scope and spirit of the invention. It is the intention in the appended claims to cover all such changes and modifications.

What is claimed is:

1. Apparatus for securing a telephone handset support to a telephone handset, said apparatus comprising:
   a handset attachment member;
   an arced shoulder rest having an inner concave side and an outer convex side, with a soft cushioning material affixed to said inner concave side;
   an intermediary attachment member for joining said attachment member to said arced shoulder rest;
   means for securing said attachment member to said telephone handset;
   said intermediary attachment member for joining said attachment member to said arced shoulder rest comprising a square node mounted on the convex side of said arced shoulder rest, and said intermediary attachment member being attached to said node, said intermediary attachment member also being perpendicularly attached to said attachment member;
   said attachment member comprising a concave, arcuate upper surface coextensively covered by a pad of cushioning material and having a substantially rectangular cross-section, said crosssection defining a hollow region therein, said cross-section further defining an integral recessed post;
   said securing means also comprising a first flexible strap member adapted to pass around and conform to a portion of said telephone handset, said first flexible strap being formed of flexible metal ribbon, and having a series of female interlocking means equidistantly dispersed along the length thereof, said female interlocking means being oriented with their longer dimensions lengthwise of said first flexible strap member, with one end of said first flexible strap member projecting perpendicularly away from said flexible strap, said end having an eyelet therein for receiving a screw;
   said securing means further comprising a second flexible strap member made of flexible metal ribbon having an integral tab end with a narrowed neck for engaging said female interlocking means located on said first flexible strap member with one end projecting at an obtuse angle away from said second flexible strap member, said end having a hole therein that is passed over said post on said attachment member for attaching said second flexible strap member to said attachment member; and a screw associated with said securing means for tightening said first and second flexible straps around said telephone handset;

said first and second flexible strap members being adapted, when secured together, to surround said telephone handset portion to secure said telephone handset to said attachment member; and said equidistantly dispersed series of female interlocking means in said first flexible strap member permitting adjustment to accommodate a variety of telephone handset sizes and shapes.

* * * * *